(12) United States Patent
Hamdan

(10) Patent No.: US 7,299,160 B2
(45) Date of Patent: Nov. 20, 2007

(54) DYNAMIC INFORMATION SOURCE MANAGEMENT

(75) Inventor: Amen Hamdan, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 55 days.

(21) Appl. No.: 11/008,815

(22) Filed: Dec. 9, 2004

(65) Prior Publication Data

US 2005/0144343 A1 Jun. 30, 2005

(30) Foreign Application Priority Data

Dec. 11, 2003 (EP) .................................. 03028571

(51) Int. Cl.
*G06F 11/00* (2006.01)
(52) U.S. Cl. ..................................................... 702/188
(58) Field of Classification Search ................ 702/188, 702/79; 709/203, 223; 340/531, 539.12; 323/243
See application file for complete search history.

(56) References Cited

U.S. PATENT DOCUMENTS

| | | | |
|---|---|---|---|
| 2004/0123641 A1* | 7/2004 | Gilbert | 73/1.02 |
| 2004/0249590 A1* | 12/2004 | Ota et al. | 702/79 |
| 2005/0083197 A1* | 4/2005 | Glenn et al. | 340/539.22 |
| 2005/0102353 A1* | 5/2005 | Murphy et al. | 709/203 |
| 2005/0114493 A1* | 5/2005 | Mandato et al. | 709/223 |
| 2005/0118704 A1* | 6/2005 | Malobabic | 435/287.1 |
| 2006/0028335 A1* | 2/2006 | Glenn et al. | 340/531 |
| 2006/0034726 A1* | 2/2006 | Sunshine et al. | 422/58 |

FOREIGN PATENT DOCUMENTS

| | | |
|---|---|---|
| EP | 1 199 860 | 4/2002 |
| WO | WO 02/099597 | 12/2002 |
| WO | WO 03/032273 | 4/2003 |

OTHER PUBLICATIONS

Dey A K: "Providing Architectural Support for Building Context-Aware Applications" PHD Thesis—Georgia Institute of Technology, Nov. 2000, XP002188154.

* cited by examiner

*Primary Examiner*—John Barlow
*Assistant Examiner*—Xiuqin Sun
(74) *Attorney, Agent, or Firm*—Oblon, Spivak, McClelland, Maier & Neustadt, P.C.

(57) ABSTRACT

A sensor management system is provided which manages the utilization of one or more sensors on behalf of a context source providing sensor information to a context creating system. Each sensor is made available for the context source by a sensor service which provides a communication interface for the sensor. The sensor management system contains a context source interaction unit, a sensor service discovery unit, a sensor management service, and a sensor access object unit.

20 Claims, 5 Drawing Sheets

DYNAMIC INFORMATION SOURCE MANAGEMENT

BACKGROUND OF THE INVENTION

1. Field of the Invention

The present invention relates to a context aware system using sensors of varying availability, whereby the availability of sensors is managed external to the context aware system.

2. Description of the Related Art

Context awareness is a key technology for the next generation of smart devices. These devices will have a broad knowledge about what a user's desires and needs are and will act accordingly. This is achieved by utilising a multitude of internal and external sensors for collecting enough information to derive a reliable context information like for instance the position of a user or of person he is interested in, the identity of users currently using a device, and the kind of devices available for a user.

The term "context" as used in this specification is defined by Anind K. Dey in "Understanding And Using Context, Personal Ubiquitous Computing Journal, Volume 5 (1), 2001, pp. 4-7", as any information that can be used to characterise the situation of an entity. An entity is hereby defined as a person, a place or an object that is considered relevant to an interaction between a user and an application, including the user and the applications themselves.

Knowledge about a context can be used in various ways to make application devices much smarter by automatically incorporating the context information. Context is usually a very complex matter resulting from the multiplicity of different types of context potentially derived from numerous different sensors. A tourist for example moving around a foreign city is supplied by her or his context aware device with an active map, and additionally with information about the sights she or he is currently viewing. A context aware device will hereto need—among others—information about the current location of the tourist. For the tourist being outdoor, this information can be obtained by using a global positioning system (GPS) but indoors, this is no longer feasible, because accessing GPS satellites is most of the time impossible within buildings. Therefore, special indoor location systems have to be used to retrieve the position information indoors. Whenever a user moves in or out of a building, his or her context aware device has to switch to another location defining system. Handling this takeover from the outdoor to the indoor location defining system and vice versa is currently performed on the application side, which works quite well when there are only a few possible sources of information available.

In some tactical military applications a sensor management system is deployed, like e.g. in tactical air fighters where it is used to reduce the workload of a pilot by controlling the sensors and allocating limited sensor resources to effectively detect, classify and track targets. The system supports the pilot by hiding the complexity of the on-board sensory by aggregating the available sensors and presenting only high-level data to the pilot. The system allows to dynamically plug in any kind of known sensor and utilise it immediately by the sensor management system. But it only works with sensors already known to the system, since there is also a need to implement the processing of the provided sensor data. Respective sensor systems are centralised and tightly coupled to the sensors.

Decentralised structures are provided by sensor networks which consist of a large number of possibly different sensors that interact together to exchange and propagate sensor data. Respective systems require no sensor management as not lookup of a specific sensor is done. Instead a request for a certain information is injected into the system and the results will be aggregated and returned to the calling instance without having any knowledge on where and how the data is created, which means that there is no management of aspects like finding and utilising the proper sensor.

For a context-aware system requiring a large number of sensors to retrieve the necessary data for obtaining the required type of information, a supervision of the availability and adequacy of the sensors is impracticable as it overburdens the system.

A tourist of the above example might for instance not only be interested in his own position, but also wants to know if certain persons move in or out a certain area, i.e. he wants to know for instance if his children are going too far away. A context system will hereto have to utilise a large number of location sensors of different types—indoor as well as outdoor—whereby the indoor location type might also differ from building to building and thus possibly from person to person to be discovered.

This is achieved by a system providing context information on request as described in the European patent application EP 1 298 527 A1 which uses an automatic set-up of a dynamic context graph configuration for providing a path from a request of context information to a context source available and suited to provide such information. A context source hereby represents the abstraction of a sensor towards the context system. The context sources are managed by the context graph's mechanism for enabling the construction of the required context information. Although the context graph configuration means is adapted to dynamically aggregate data from various context sources into high-level context information, it is not adapted and would be overburdened to search and utilise sensors supplying a context source.

BRIEF SUMMARY OF THE INVENTION

It is therefore an object of the present invention to provide a system for dynamically supplying a context source with the sensor information required.

This object is achieved by a sensor management system as claimed in the independent claim.

The sensor management system according to the present invention manages the utilisation of one or more sensors by a context source, whereby each sensor is made available by means of a sensor service providing a communication interface for the sensor to a direct or to a network link. The sensor management system contains a context source interaction means for interacting with the context source, whereby the interaction includes a reception of a request from the context source for one or more sensors, each sensor of a defined characteristic. The sensor management system further has a sensor service discovery means for discovering a sensor service available by the direct link or the network link and for storing lookup information concerning the sensor services discovered. The sensor management system further comprises a sensor management service for determining from the sensor service discovery means the particular lookup information stored for the sensor service which provides access to the sensor of the characteristic requested by the context source and which is available by the direct link or network link. A sensor access object means of the sensor management system further provides a specific query to the sensor service which corresponds to the request received by the context source interaction means and the particular lookup information determined by the sensor management service.

Due to the nature of a user's environment, the sensors required for providing the necessary data for evaluating a context describing the user's environment change very frequently. The proposed sensor management system saves the context system to care for the constant changes in the availability of the required sensors.

Further advantageous features are claimed in the respective dependent claims.

For enabling the context source to supply the context system with the required sensor data, the sensor access object means is advantageously adapted to retrieve sensor data from the sensor service and to supply the sensor data to the context source. To ensure, that a selected sensor is actually suited to serve a request from the context source, the sensor access object means preferably comprises a probing means for probing a sensor with respect to its accessibility and/or its suitability corresponding to the request received by the context source interaction means. The sensor access object means may further be implemented comprising a sensor instantiation means for establishing a communication link to a specific sensor service which corresponds to the request received by the context source interaction means, as this allows an explicit usage of a particular sensor by a context source.

For an effective sensor management, the sensor service's discovery means suitably comprises a database for managing the lookup information of each sensor service discovered. For keeping track of the availability status of the sensors, the sensor service discovery is suitably performed by the sensor service discovery means on a regular basis.

As many data are needed on the occurrence of certain events, the context source interaction means preferably provides an event registration for registering an event information received from the context source for use by any means of the sensor management system and/or sensor service. In a preferred embodiment, the context source interaction means further provides an event notification for notifying the context source of an event triggered from a means of the sensor management system and/or sensor service.

To simplify the communication between the context source and the sensor service related to a sensor, the context source may request a sensor by directly handing a sensor access object to the context source interaction means for reception.

BRIEF DESCRIPTION OF THE SEVERAL VIEWS OF THE DRAWINGS

In the following description, the present invention is explained in more detail with respect to special embodiments and in relation to the enclosed drawings, in which.

DETAILED DESCRIPTION OF THE INVENTION

A system providing context information is based on so-called context sources which acquire the information required for setting up the context available. The sensor management according to the present invention hides the complexity of the sensor utilisation necessary to retrieve the appropriate information for the context sources from the context creating system. The sensor management takes over the complex task of looking up suitable sensors for the context source. Ideally, the context source just passes the request for a certain sensor to the sensor management which then performs the lookup and any other required procedure to utilise the sensor, and eventually returns a respective reference to the sensor. In case of changes in the availability of a sensor, the sensor management should either be able to exchange a currently used sensor with another suitable one, or report a failure to the context graph management if this is not possible.

The sensor management needs to handle numerous different sensors for finding and utilising required resources. Sensors are advantageously classified according to the type of information required by a context source, whereby the classification is typically not orthogonal, i.e. a certain sensor can be a member of more than one class. Examples for sensor classes are e.g. a sensor's mobility, accessibility, addressability, or the like. A mobility class is typically concerned with sensor mobility properties like being stationary or potentially mobile. Stationary sensors have a geographically fixed position and are probably always accessible by the same communication means, like e.g. the Internet. On the other side, moving, i.e. potentially mobile sensors might utilise different communication means which might vary in availability and the information provided might further depend on the current situation. Sensors, which move with respect to the environment defined by a context creating system typically require means to compensate for changes in their availability.

A sensor accessibility class will distinguish between locally and globally accessible sensors. Local sensors can usually only be used when being geographically close to the context system requiring it. But also a sensor, that can be accessed via a nearby device interaction is regarded as a local sensor. Sensors have to be found and looked up in different ways dependent on the type of accessibility. It is therefore one of the requirements of a sensor management system to implement a respective sensor detection and lookup enabling the context source to be freed of having to interact with any underlying technology.

A third sensor class, the sensor addressability class concerns the parameterised addressability versus the fixed usage of a sensor. Some sensors need certain input parameters that describe what kind of information is required. An example is a GSM (Global System for Mobile Communications)

location sensor, which requires the phone number of a person to be located in order to return a value. Sensors with fixed usage do on the other side not require any parameters and simply return a certain available value. An example for this kind of sensors is a temperature sensor within a room. A parameterised sensor needs a passing down of the required parameters with every step of its utilisation. It is to be noted that the sensor classes described above are not limiting to possible classification properties of sensors usable by context sources, but that other sensor classifications are just as possible like for instance a class related to the spatial reference of a sensor.

Figure 1:
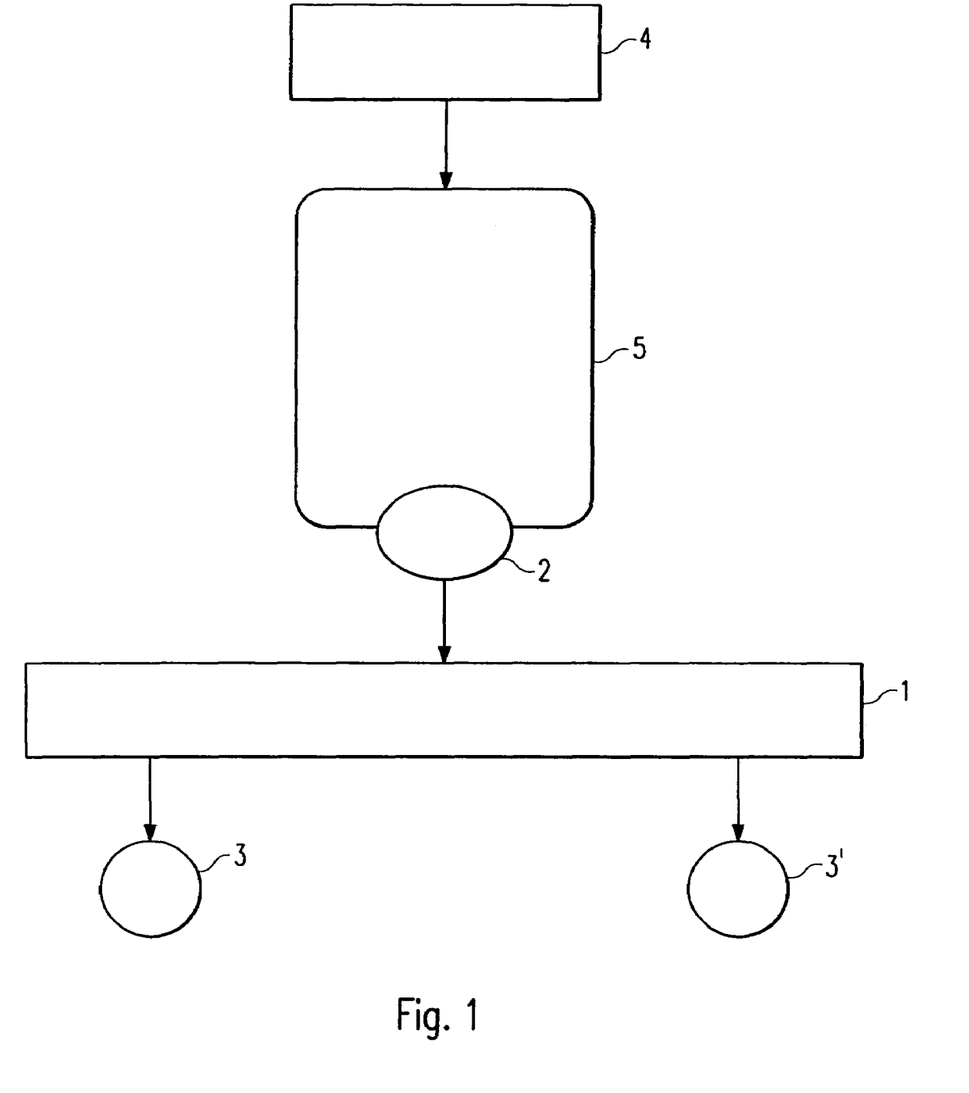
FIG. 1 shows the integration of the sensor management according to the present invention in a context providing system.

To relieve a context creating system 5 providing context information for a client 4 from handling sensor related aspects, the present invention proposes a sensor management system 1 which is located—as shown in FIG. 1—within the communication path between a context source 2 of the context creating system 5 and sensors 3 and 3' which represent possible candidates for providing the context source 2 with the required sensor data.

Figure 4:
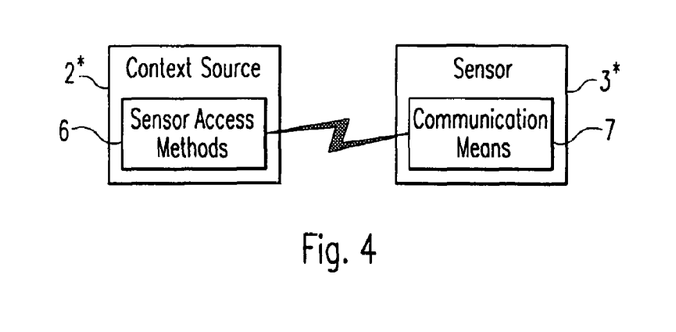
FIG. 4 shows the communication scheme principle of FIG. 2 with integrated components.

A sensor management according to the present invention takes over the lookup of possible sensors, the management of changes in the availability of sensors, and the collecting of information concerning addressing details of each sensors. As the sensor management is located in the communication link between a context source and the sensors which are possibly utilised by it, the communication scheme between a context creating system and a sensor is discussed first. A context creating system communicates with a sensor via context source such that the context source represents the abstraction of the sensor towards the context creating system. In the simplest case, the communication between a context source and a corresponding sensor is formed as shown in FIG. 4. The context source hereby communicates with the sensor directly, which requires, that the context source and the sensor are both equipped with a communication means enabling an exchange of data between the two.

Figure 2:
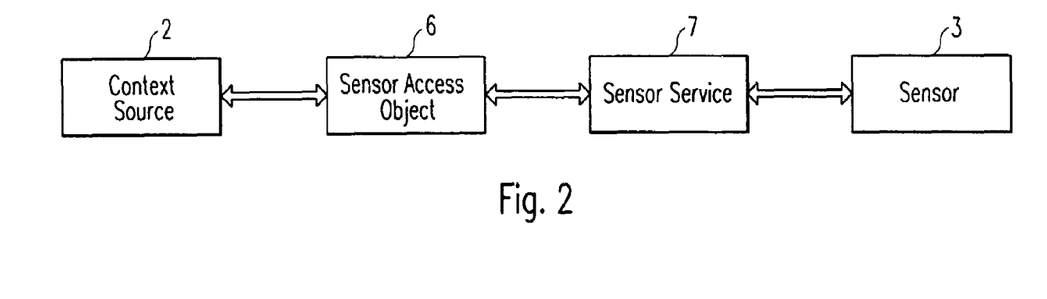
FIG. 2 shows a high level view of the communication scheme principle which links a context source to a sensor.

A high-level view of the communication scheme results in the components shown in FIG. 2. The sensor access object implements any functionality which is required to access and query a sensor service 7. This includes any communication protocol and additional means needed to retrieve information from the sensor service and, if required, to initialise and parameterise the sensors to the sensor service. The sensor service 7 is the virtual representation of the sensor within a direct or a network link and enables the addressing of the sensor 3. In case of a local sensor, the sensor service might be reduced to a simple driver. In any case, the sensor service handles the direct communication with the sensor, makes the sensor discoverable and usable by the sensor access object. The sensor access object implements the sensor access methods towards the sensor service.

Figure 3:
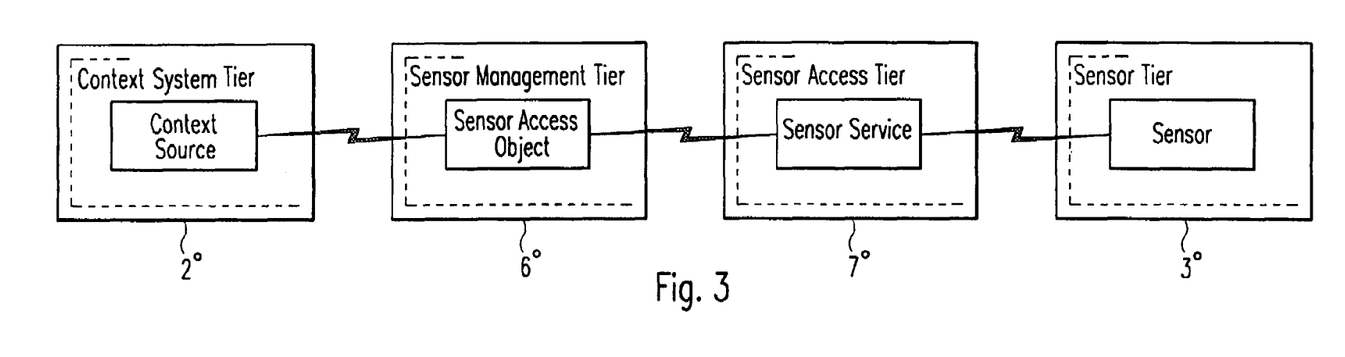
FIG. 3 shows the communication scheme principle of FIG. 2 in view of the logical processing.

Any of the components shown in FIG. 2 might reside on various notes as depicted in the tier view in FIG. 3. Please note, that the distribution of components to nodes is not necessarily required. Especially since in most cases, the sensor access object 6 and the sensor service 7 will be merged into the context source or the sensor, respectively, as shown in FIG. 4. Even an integration of more than two of the mentioned components into one is possible. However, the functional blocks will still be present as shown.

Figure 5:
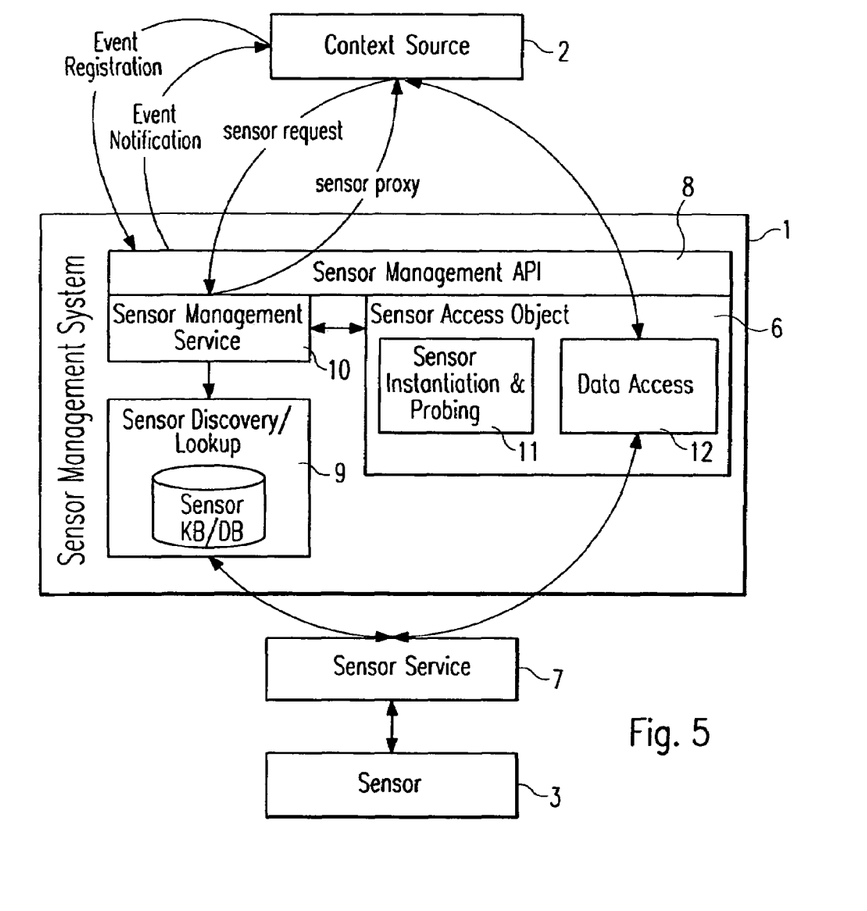
FIG. 5 shows an implementation of the communication scheme with a sensor management system according to the present invention.

An implementation of a communication scheme of FIG. 2 according to the present invention is shown in FIG. 5. The context source 2 as a context system specific component dispatches requests from a number of context graphs for context information available through means of a sensor. The request is directed to a suited sensor service 7 providing the required sensor information. The context source may furthermore perform some simple data conversation to align the data from a sensor service into some context system internal representation. The sensor 3 connected to the sensor service 7 is the actual physical or logical information source. It is accessed through the sensor service 7. The sensor management system 1 receives a request for a certain sensor from a context source 2 and provides thereupon a query corresponding to the request received to a sensor service 7 which represents the requested sensor.

The sensor management system 1 contains a context source interaction means 8 for exchanging data with the context source 2 as shown in FIG. 5. The context source interaction means 8 is implemented in form of a dedicated application programmable interface (API), the so-called sensor management API. The request for a certain sensor from a context source 2 is received by the sensor management API. The request may contain in addition to the required sensor characteristics like e.g. the sensor type, the sensor output, the sensor service access protocol etc. also a sensor access object and parameters.

The sensor management system 1 performs a lookup of a suitable sensor by searching for a sensor service corresponding to the requested characteristic. If no suitable sensor is found, an error is reported to the context source. For being able to offer the respective service, the sensor management system 1 contains a sensor service discovering means 9 which permanently checks for locally and remotely available sensors or performs a specialised search if a sensor required by the context source 2 is not yet known to the sensor management system 1. Information concerning the lookup information for sensor services 7 discovered is then stored within the sensor service discovery means 9. Corresponding to the sensor characteristics defined in the request from the context source 2, the sensor management service 10 performs a lookup of a suitable sensor and probes it via methods given in the sensor access object 6. Probing ensures, that the proposed sensor is in fact suitable and that the access to the sensor is indeed possible. The next step of the probing is instantiating the sensor, i.e. establishing an actual communication link to it. In many cases, probing and instantiation are tightly coupled but sometimes completely separate components are required for that purpose. Probing and instantiating a sensor 3 via its sensor service 7 is done by means of a sensor access object 6 which provides the query to the respective sensor service 7. The query performed by the sensor access object 6 is based on the request received by the context source interaction means 8 and the particular lookup information determined by the sensor management service 10 from the sensor service discovery means 9. In case the request from the context source 2 already contained a sensor access object, this sensor access object will be passed on by the sensor access object means 6 to the respective sensor service 7. Parameters given in the query from the context source 2 which might contain information on the requesting entity, the desired quality of service or the like, are also passed to the sensor access object means 6 and incorporated into the query to the sensor service 7.

A sensor access object contains the main logic to query information from the sensor service 7 and thus the sensor 3. The sensor access object could either be retrieved from the context source 2 or from the sensor service 7. Furthermore, the sensor management system 1 may keep every previously occurred sensor access object in a repository e.g. in the lookup information stored in the sensor service discovery means 9, and reuse it in case the respective sensor has to be accessed again.

A sensor service 2 is the virtual representation of a sensor 3 and will as such respond to any direct lookup or discovery request. The sensor service is thus the main point of access for the sensor management system 1. The sensor service discovery means 9 therefore maintains a list of all available sensor services 7 and their characteristics. The means to find a sensor service 7 which suites a request from a context source 2 is implemented in form of the sensor management service 10.

Sensors are very low-level components and are usually not able to communicate with a context creating system directly. In other cases, the sensor might only be discoverable implicitly and lack the according sensor service 7 to get into contact with a context system. Sensors are therefore only accessible by a context system through instantiating a respective sensor service 7.

The sensor management API provides an event registration and event notification means that propagates all events that are generated within the system to any interested object.

The sensor management system 1 allows the context source 2 to specify the characteristics of the sensor. This can include inherent parameters as for example sensors that relate to a certain entity. Furthermore, the source can implement its own sensor access object that communicates with the sensor in a highly customised way. Last but not least the context source 2 can explicitly specify parameters that will be passed through the sensor access object and the sensor service.

According to the above-described design of the sensor management system 1, the following steps have to be performed in order to use a sensor. First, a context source 2 requests a sensor with certain characteristics from the sensor management by passing the required attributes to it. Additionally, it can also pass the sensor access object that wants to be used. If the context source did not provide a sensor access object with the request, the sensor management system tries to use a sensor access object that might have been given by the sensor service 7, and if this also fails, will use one that was retrieved from a third party or that was cached from a prior request if available. In case no sensor access object is available for any suitable sensor, an error is reported to the context source. Second, the sensor management system 1 performs a lookup of a suitable sensor by searching for the according sensor service. If the respective sensor was not found, an error is reported to the context source 2. Third, if an appropriate sensor service was found, it will be probed by using the sensor access object and the reference to the sensor access object that is returned to the context source.

The sensor access object means 6 contains a data access component 12 for sending a query to a sensor device 7 for retrieving sensor data from the sensor service 7, and for supplying the sensor data to the context source 2. The sensor access object 6 further comprises a sensor instantiation and probing means 11. This component 11 probes a sensor 3 via its sensor service 7 with respect to its accessibility and/or suitability corresponding to the request of the context source 2. It further instantiates a sensor 3 by establishing a communication link to a specific sensor service 7 connected to the sensor 3 corresponding to a particular request of the context source 2.

The utilisation of sensors described is accomplished by means which describe sensors and sensor lookup/discovery mechanisms. The sensor management system 1 handles changes in the availability of possible sensors in a transparent manner for the context source. For describing the capabilities of a sensor, no interface description is needed as the respective knowledge is already inherently available in the sensor access object.

The sensor discovery implemented by the sensor service discovery means 9 comprises two aspects. The first one is finding any sensor in the local surroundings, the other one is implementing some means to look up any sensors that could be reached by a wider scoped communication means like e.g. the Internet.

Figure 6:
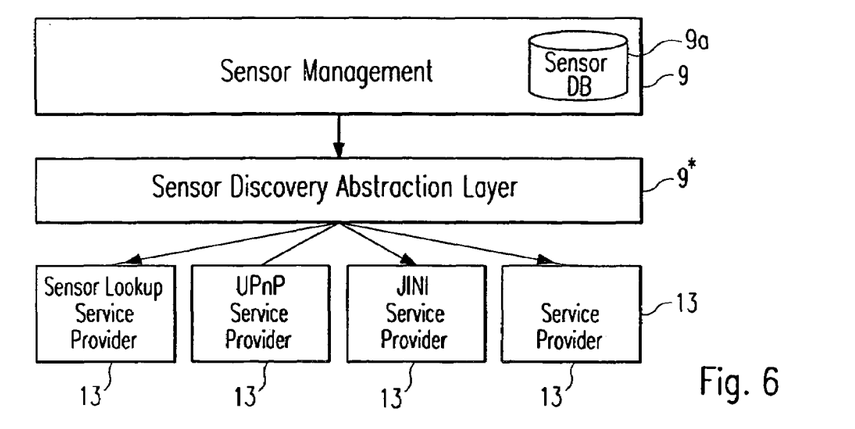
FIG. 6 shows the abstraction layers of the sensor service discovering means.

To be able to perform the sensor lookup independent from the used discovery mechanisms, a sensor discovery abstraction layer 9* is introduced as shown in FIG. 6. This layer 9* allows different service providers 13 to be used for finding a suitable sensor by taking a unified sensor description from a querying party. The service provider could implement either an active information pull or an information push if certain sensors become available, or a reactive scheme that checks for sensors upon request. The sensor management additionally holds a data base 9a that contains all known sensors and their attributes. Service providers 13 have to report sensor losses which will cause the according entry to be removed from the sensor data base 9a.

The detailed knowledge in how to access the sensor is encapsulated within the sensor access object. In case contact to the sensor is lost, the sensor access object can either fire events to interested components or inform the context source about this problem. At first the sensor management system 1 tries to compensate by switching to another sensor if such is possible. In case this fails, the sensor management system will inform the context source 2 which can then in turn decide to either switch to another sensor 3 or if necessary and possible, to another sensor category. It further might request a reconfiguration of a context graph in the context creating system. If this is not possible, the whole graph might be invalidated and re-created.

In principle, the sensor access object encapsulates all knowledge on how to access a sensor. This also includes which parameters are available and how they are passed to the sensor service. In some cases it might however be useful to allow the sensor access object to access sensor services of which they do not have the full parameter set available. To accomplish this, the sensor management system 1 allows providing some parameters on behalf of the sensor access object.

For example, a sensors service might require a login/password combination for accessing its data. In case the sensor access object does not know on how to provide, retrieve or pass this information to the sensor, the sensor management system 1 might provide this information on behalf of the sensor access object. The sensor management hereto has to be aware on how parameters of sensor services are specified. This depends on how the interface is described and to what extent the parameters are known to the sensor management system.

One of the important issues that have to be addressed by the sensor management is the lookup of required sensors as already described above. For this purpose a means for describing a sensor independent of the underlying technology is required.

One possibility to describe a resource like a sensor is based on interfaces. Here every resource exports an interface that is used to describe its capabilities. In addition attribute values within objects can be used to describe a resource property. In case a certain resource is wanted, a potential client passes an interface describing the service altogether with objects and inherently a number of attributes with certain values to the respective correspondent. A corresponding interface/object resource description is e.g. using the Jini system. The major drawback from such a solution is that it very much depends on the underlying programming language. E.g. Jini depends on all components to be implemented in Java.

To avoid being bound to tightly to a certain programming language or model, other systems rely on a meta language based approach to allow easy interchange of service specification information. Within this approach the service characteristics and probably its interface are described by using a defined language. Possible implementations are given e.g. by the web service description language and the UPnP device templates.

In case only very few different sources are available, a common naming of them could be possible. If a certain sensor is required, it is simply looked up or referenced via its name without having to additionally specify any capabilities or attributes. UPnP implements at least partially such a scheme by providing a predefined set of services that expose a predefined functionality. For such services no information on capabilities and interfaces is required since knowledge about them is already commonly available.

The present invention therefore uses a solution which specifies required sensors towards the sensor management 9. It will then be translated by the according service provider of the sensor discovery abstraction layer into a format or protocol that is understood by the respective resource discovery. The proposed XML based description is mainly based on simple key value pairs. A number of these key values from the sensor description set that is used to identify a certain sensor as given in the example below.

```
<sensor>
    <sensor_type>temperature</sensor_type>
    <sensor_format>degrees_celcius</sensor_format>
    <sensor_id> 000-000-000-000-000-000</sensor_id>
    <input type="optional" format="int">accuracy</input>
    <input type="optional" format="int">init_reset</input>
    <access_method protocol "HTTP" version="1.0" type="pull">
        <param name="URL">http://nowhere.org:8080/sensor
        </param>
    </access_method>
    <access_method protocol="RMI" version="1.3" type="push">
        <param name="URL"> rmi://nowhere.org:3128/sensor
        </param>
        <param name="RMIServerClass>" org.nowhere.ServerImpl
        </param>
    </access_method>
    <attributes>
        <param name="sampling rate" unit="seconds">10</param>
        <param name="location"> Room 33.37</param>
    </attributes>
</sensor>
```

Context sources may pass a number of sets to the sensor management. In case for any of the sets a matching sensor is found, the sensor management indicates which of the sets fitted to the sensor access object which can in turn change its access methods if possible.

In addition to the description means also some query language could be deployed. With this it could be possible to query for certain sensors or even certain values of sensors via a high-level query language.

Figure 7:
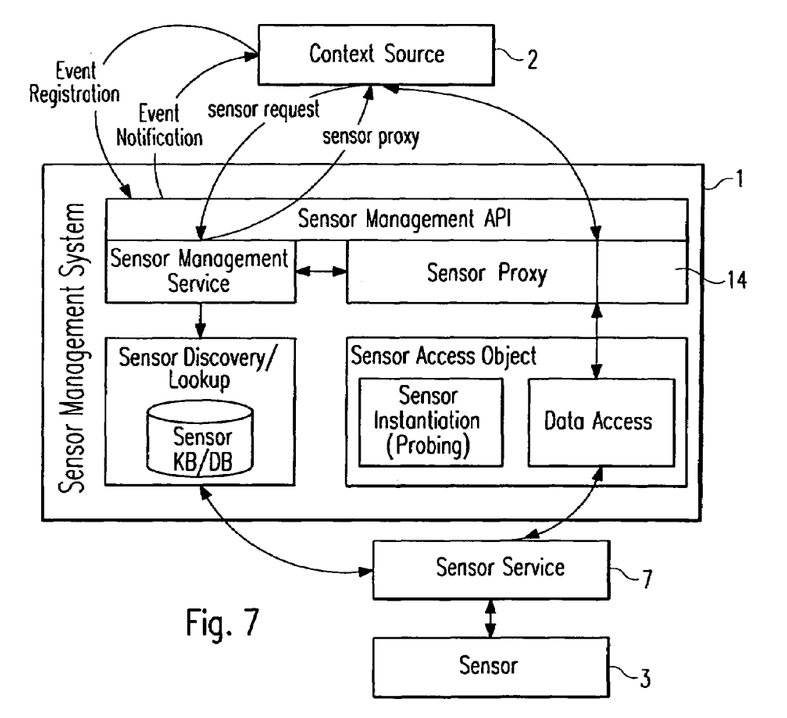
FIG. 7 shows an implementation of the communication scheme according to FIG. 2 with a sensor management incorporating a sensor proxy.

In order to allow the sensor management system to notice and to react to possible problems in the sensor access, a sensor proxy 14 can be used in the sensor management system 1 as shown in the high level view of the respective sensor management system architecture shown in FIG. 7. Once a context source 2 requests a certain sensor 3 and the probing of the sensor 3 via the sensor access object means is successful, the sensor access object is encapsulated within a sensor proxy and returned to the context source for data access. The proxy object allows the sensor management system 1 to hook into a communication between the sensor access object means 6 and the context source 2 and thus enables it to check for problems or errors that might have occurred, and to act accordingly.

Figure 8:
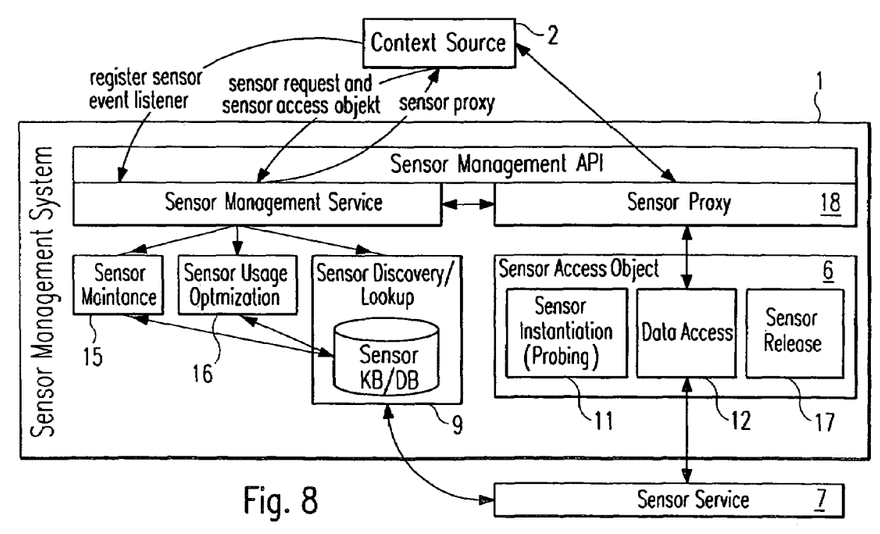
FIG. 8 shows an extended architecture for a further embodiment of a sensor management system according to the present invention.

A more sophisticated sensor management system 1 is shown in FIG. 8. It covers also aspects like sensor usage optimisation and more sophisticated sensor maintenance mechanisms. With this, the system is able to exchange sensors if a better configuration is found achieved. The sensor service discovery means 9 is supplemented by a sensor maintenance means 15 and a sensor usage optimisation 16. The sensor access object means is extended by a sensor release means 17. The sensor maintenance component 15 checks for the availability of any known sensor, particularly the ones that are currently in use by a context source 2. If a sensor 3 becomes unavailable, it initiates an update of the sensor data base and informs the sensor management service 10 of this. In some cases, sensor specific knowledge is required to determined if a sensor 3 is no longer present. Hence, the sensor maintenance might utilise sensor access object functionality to e.g. probe a sensor. It might also monitor sensor proxies from the sensor proxy means 18 that are currently in use by the sensor management system. A sensor usage optimisation component 16 monitors the currently used sensors and the recently found ones. It tries to check if any used sensor 3 could be exchanged by another more suitable one. If e.g. the usage of a sensor 3 is very costly, like e.g. in terms of resources, monetary units or the like, and another less demanding sensor becomes available, the sensor usage optimisation component 16 will try to initialise a sensor exchange. In more complex scenarios, the sensor usage optimisation components 16 might also try to combine a number of sensors to create a more complex one if required by any component.

The sensor proxy component 18 is an object that is used as a mediator between the sensor access object and the sensor service. With this the sensor management service 10 is able to snoop into a communication and to determine if problems occur. Please note that this mechanism only works with some sensors without additional knowledge. If e.g. the communication between the context source 2 and the sensor service is encrypted, it could be impossible to determine any details on the problem that has occurred. However, other types of problems like e.g. time-outs when requesting information from a sensor can be easily captured and communicated. The sensor proxy therefore is carried out configurable and extensible for being customised in its behaviour according to a current sensor 3 used.

The sensor access object means encapsulates the actual program logic for accessing the sensor 3. Details on it have already been explained above. The extended sensor access object 6 of FIG. 8 contains 3 functional blocks, the sensor probing and instantiation 11, the data access means 12 and the sensor release means 17. By probing the sensor it is determined if it really can be used and if it is indeed available. The probing functionality cannot only be used when attempting to access the sensor but also by other components like the sensor maintenance means 15. The main functionality, however, is the data access, which incorporates any communication or protocol or security issues which are necessary to retrieve the sensor data from the sensor service 7. Eventually, when the sensor is no longer required or when it becomes unavailable, some release procedures might be required.

Figure 9:
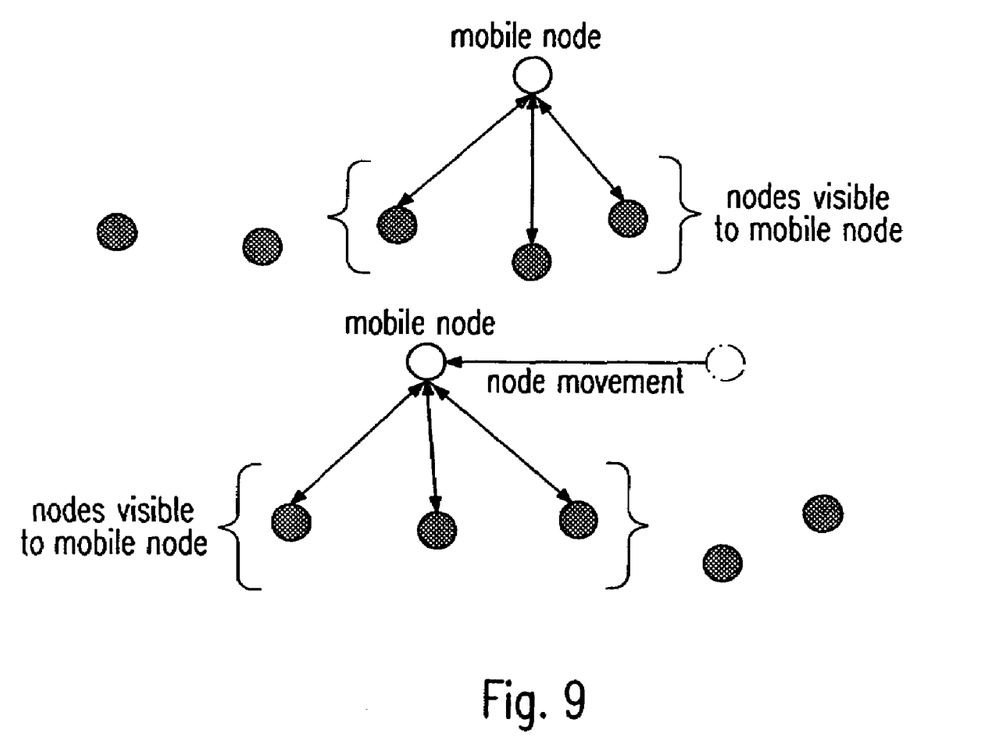
FIG. 9 shows an example for an application of a sensor management system according to the present invention for a context system present on a mobile note.

To illustrate the usage and capabilities of a sensor management system 1, a concrete application scenario is shown in FIG. 9. The scenario comprises a network of mobile nodes like in an ad-hoc network in which any node might be able to measure the physical distance to others. To enhance the accuracy of the distance measurement, the node will not only use its local information but also values from any node in the environment. This is especially useful if other nodes provide some additional information like position information retrieved from a GPS (Global Positioning System) system.

Due to the nature of an ad-hoc network the nodes in the environment will be changing rather frequently. This is especially true if the nodes are mobile as shown in FIG. 9. As already described, the inherent distance measurement might only be one source of information in this scenario. Other data that has to be taken into account might be originating from a GPS sensor, indoor tracking systems or the like. All the sources in the surrounding have to be found and made available to any instance that performs the distance or location calculation, respectively. The problem of managing various information sources becomes even more demanding if a multitude of different sensors has to be managed.

The sensor management system 1 will track changes in the environment and tries to find any present sensor 3. In the described scenario this includes the distance measurement sensor 3 of other nodes, GPS sensors in the surroundings and so on. Additionally it will try to exchange used sensors by others as the node moves on behalf of the instance utilising them. If not suitable sensor is present, the sensor management might try to utilise a number of sensors to create a new virtual sensor to suite the needs. E.g., if a client requires a three-dimensional position but only a two-dimensional position and an altitude sensor are available, the sensor service can try to create a virtual three-dimensional sensor out of the two. Any more complex operation is anyway performed dynamically within the context system.

Overall the instance requiring the sensor data will be unburdened from the need to track the changes in the environment on its own.

The invention claimed is:

1. A sensor management system for managing a utilization of one or more sensors by a context source, whereby each sensor is made available by means of a sensor service providing a communication interface for the sensor to a direct link or a network link, the sensor management system comprising:
   a context source interaction means for interacting with the context source including a reception of a request from the context source for one or more sensors each of a defined characteristic;
   a sensor service discovery means for discovering locally or remotely available sensors via a respective sensor service available by the direct link or the network link on a regular basis, whereby the sensor service discovery means comprises a database for storing and managing lookup information of each discovered sensor service;
   a sensor management service means for determining from the sensor service discovery means the particular lookup information stored for the sensor service which provides access to the sensor of the characteristic requested by the context source and which is available by the direct link or the network link; and
   a sensor access object means for retrieving sensor data from the sensor service and to supply the sensor data to the context source by providing a specific query to the sensor service corresponding to the request received by the context source interaction means and the particular lookup information determined by the sensor management service, and said sensor access object means comprising:
   a probing means for probing the sensor with respect to its accessibility and/or its suitability corresponding to the request received by the context source interaction means, and
   a sensor instantiation means for establishing a communication link to a specific sensor service which corresponds to the request received by the context source interaction means; and
   a data access means for sending said specific query to the sensor service for retrieving sensor data from the sensor service and for supplying retrieved sensor data to the context source.

2. The sensor management system according to claim 1, whereby the context source interaction means provides an event registration for registering an event information received from the context source for use by any means of the sensor management systems and/or sensor service.

3. The sensor management system according to claim 1, whereby the context source interaction means provides an event notification for notifying the context source of an event triggered from a means of the sensor management system and/or the sensor service.

4. The sensor management system according to claim 1, whereby the request received by the context source interaction means from the context source has the form of a sensor access object.

5. The sensor management system of claim 1, wherein the probing means determines the functionality of the sensor probed.

6. The sensor management system according to claim 1, further comprising:
   sensor proxy means for allowing the sensor management system to look into a communication between the sensor access object means and the context source in order to enable the sensor management system to check for errors or problems.

7. The sensor management system according to claim 1, wherein the sensor service discovery means adds or removes the one or more sensors in a flexible and dynamic manner.

8. The sensor management system according to claim 1, wherein the probing means determines whether the capabilities of the sensor probed matches at least one characteristic requested by the context source.

9. The sensor management system according to claim 1, further comprising:
   a sensor usage optimization means for determining whether a linked sensor should be exchanged with a more suitable sensor device.

10. The sensor management system according to claim 1, wherein the probing means for probing the sensor with respect to its accessibility and/or its suitability probes a sensor to determine if the sensor is mobile or stationary.

11. The sensor management system according to claim 1, wherein the probing means for probing the sensor includes probing a locally accessible sensor and determining whether the locally accessible sensor is geographically close to the context source.

12. The sensor management system according to claim 1, wherein the context source interaction means receives a request from the context source including information required by the sensor to provide a reading.

13. A sensor management system for managing a utilization of one or more sensors by a context source, whereby each sensor is made available by means of a sensor service providing a communication interface for the sensor to a direct link or a network link, the sensor management system comprising:
- a context source interaction unit configured to interact with the context source including a reception of a request from the context source for one or more sensors each of a defined characteristic;
- a sensor service discovery unit configured to discover locally or remotely available sensors via a respective sensor service available by the direct link or the network link on a regular basis, whereby the sensor service discovery unit comprises a database for storing and managing lookup information of each discovered sensor service;
- a sensor management service configured to determine from the sensor service discovery unit the particular lookup information stored for the sensor service which provides access to the sensor of the characteristic requested by the context source and which is available by the direct link or the network link; and
- a sensor access object unit configured to retrieve sensor data from the sensor service and to supply the sensor data to the context source by providing a specific query to the sensor service corresponding to the request received by the context source interaction unit and the particular lookup information determined by the sensor management service, and said sensor access object unit comprising:
  - a probing unit configured to probe the sensor with respect to its accessibility and/or its suitability corresponding to the request received by the context source interaction unit, and
  - a sensor instantiation unit configured to establish a communication link to a specific sensor service which corresponds to the request received by the context source interaction unit; and
  - a data access component configured to send said specific query to the sensor service for retrieving sensor data from the sensor service and for supplying retrieved sensor data to the context source.

14. The sensor management system according to claim 13, whereby the context source interaction unit is configured to provide an event registration for registering an event information received from the context source for use by any unit of the sensor management systems and/or sensor service.

15. The sensor management system according to claim 13, whereby the context source interaction unit is configured to provide an event notification for notifying the context source of an event triggered from a unit of the sensor management system and/or the sensor service.

16. The sensor management system according to claim 13, whereby the request received by the context source interaction unit from the context source has the form of a sensor access object.

17. A sensor management method for managing a utilization of one or more sensors by a context source, whereby each sensor is made available by means of a sensor service providing a communication interface for the sensor to a direct link or a network link, the method comprising:
- interacting with the context source including a reception of a request from the context source for one or more sensors each of a defined characteristic;
- discovering locally or remotely available sensors via a respective sensor service available by the direct link or the network link on a regular basis, whereby the sensor service discovery comprises storing and managing lookup information of each discovered sensor service in a database;
- determining from the sensor service discovery the particular lookup information stored for the sensor service which provides access to the sensor of the characteristic requested by the context source and which is available by the direct link or the network link; and
- retrieving sensor data from the sensor service and to supply the sensor data to the context source by providing a specific query to the sensor service corresponding to the request received by the interaction and the particular lookup information determined by the sensor management service, including,
- probing the sensor with respect to its accessibility and/or its suitability corresponding to the request received by the interaction, and
- establishing a communication link to a specific sensor service which corresponds to the request received by the interaction; and
- sending said specific query to the sensor service for retrieving sensor data from the sensor service and for supplying retrieved sensor data to the context source.

18. The sensor management method according to claim 17, whereby the interaction provides an event registration for registering an event information received from the context source.

19. The sensor management method according to claim 17, whereby the interaction provides an event notification for notifying the context source of an event triggered from a step of the sensor management method and/or the sensor service.

20. The sensor management method according to claim 17, whereby the request received by the interaction from the context source has the form of a sensor access object.

* * * * *